United States Patent
Hayasaki

(10) Patent No.: US 8,384,952 B2
(45) Date of Patent: Feb. 26, 2013

(54) IMAGE PROCESSING AND FORMING APPARATUS, METHOD AND COMPUTER-READABLE MEDIUM FOR IMPROVING DOCUMENT IMAGE COMPRESSION EFFICIENCY AND QUALITY

(75) Inventor: Makoto Hayasaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 918 days.

(21) Appl. No.: 12/490,126

(22) Filed: Jun. 23, 2009

(65) Prior Publication Data
US 2009/0323089 A1    Dec. 31, 2009

(30) Foreign Application Priority Data

Jun. 24, 2008   (JP) ................................. 2008-164915

(51) Int. Cl.
 *G06F 15/00* (2006.01)
 *G06K 9/46* (2006.01)
 *G06T 9/00* (2006.01)
(52) U.S. Cl. ......... 358/1.9; 358/1.8; 358/1.15; 358/540; 358/300; 382/232; 382/234; 382/239; 382/244; 382/173; 382/190; 345/555; 345/660
(58) Field of Classification Search .................. None
See application file for complete search history.

(56) References Cited

U.S. PATENT DOCUMENTS

| | | | |
|---|---|---|---|
| 5,774,634 A | 6/1998 | Honma et al. | |
| 5,848,185 A * | 12/1998 | Koga et al. | 382/173 |
| 5,903,360 A | 5/1999 | Honma et al. | |
| 6,701,008 B1 * | 3/2004 | Suino | 382/164 |
| 6,701,012 B1 * | 3/2004 | Matthews | 382/173 |
| 7,283,674 B2 * | 10/2007 | Bai et al. | 382/232 |
| 7,782,339 B1 * | 8/2010 | Hobbs et al. | 345/626 |
| 7,783,117 B2 * | 8/2010 | Liu et al. | 382/232 |

FOREIGN PATENT DOCUMENTS

| | | |
|---|---|---|
| JP | 2984332 B2 | 11/1999 |
| JP | 2002-94805 A | 3/2002 |
| JP | 2002-232708 A | 8/2002 |
| JP | 2007-335983 A | 12/2007 |
| JP | 2008-28717 A | 2/2008 |

* cited by examiner

*Primary Examiner* — Steven Kau
(74) *Attorney, Agent, or Firm* — Birch, Stewart, Kolasch & Birch, LLP

(57) ABSTRACT

A compression process and apparatus includes: generating a background layer by extracting a text region from an input image and removing at least the text region from the input image; extracting a background region corresponding to a color characteristic from a background layer; recording coordinate values of the background region extracted; and storing the background region in a form in accordance with the color characteristic of the background region extracted. Further, a data storage section stores a local background and a page background as information including the background color estimated and the coordinate values of the background region including the background color, each of which local background and page background are included in the background layer. This configuration makes it possible to improve a compression efficiency and image quality.

15 Claims, 15 Drawing Sheets

FIG. 5

| INDEX VALUE | COLOR (R, G, B) | START POINT | END POINT | NUMBER OF PIXELS |
|---|---|---|---|---|
| 1 | 0, 0, 0 | 50, 100 | 3150, 1249 | 1,500,000 |
| 2 | 0, 0, 255 | 100, 1250 | 3000, 1499 | 250,000 |
| 3 | 255, 0, 0 | 100, 1500 | 3000, 1749 | 250,000 |
| 4 | 0, 0, 10 | 100, 1750 | 3000, 1999 | 250,000 |
| ... | ... | ... | ... | ... |
| N | Rn, Gn, Bn | Xns, Yns | Xne, Yne | N |

FIG. 6

| COLOR (R, G, B) | START POINT | END POINT | NUMBER OF PIXELS |
|---|---|---|---|
| — | — | — | — |
| 0, 0, 0 | 50, 100 | 3150, 1249 | 1,500,000 |
| 0, 0, 255 | 100, 1250 | 3000, 1499 | 250,000 |
| 255, 0, 0 | 100, 1500 | 3000, 1749 | 250,000 |
| 0, 0, 10 | 100, 1750 | 3000, 1999 | 250,000 |
| ... | ... | ... | ... |
| Rn, Gn, Bn | Xns, Yns | Xne, Yne | N |

IMAGE PROCESSING AND FORMING APPARATUS, METHOD AND COMPUTER-READABLE MEDIUM FOR IMPROVING DOCUMENT IMAGE COMPRESSION EFFICIENCY AND QUALITY

This Nonprovisional application claims priority under 35 U.S.C. §119(a) on Patent Application No. 2008-164915 filed in Japan on Jun. 24, 2008, the entire contents of which are hereby incorporated by reference.

TECHNICAL FIELD

The present invention relates to an image processing apparatus, image processing method, and the like each of which is for compressing a digital image.

BACKGROUND ART

In recent years, a digital image system has been amazingly developed, and construction of digital image processing technology has been progressed. For example, in the field of a copying machine and a multifunction printer each using an electrophotographic method or an ink-jet method, it is further requested to store documents as electronic data and to manage thus stored document files. Moreover, in the field, documents are compressed and transmitted via e-mail.

A scanned image that is scanned by a scanner generally has a large file size. Accordingly, an image compression technique is indispensable in storage and transmission of the scanned image. One image compression technique for achieving a high compression efficiency is based on layer separation. According to the image compression technique based on the layer separation, an image is separated into a foreground layer and a background layer, each of which is then compressed by using a compression technique appropriate for each of the foreground layer and the background layer. Ultimately, a highly compressed image is generated. The foreground layer contains text and line drawing, and is generally compressed by a lossless compression technique such as JBIG (Joint Bilevel Image Group), MMR (Modified Modified Read Code), or LZW (Lempel Ziv Welch).

On the other hand, the background layer contains image contents other than the text and line drawing and is generally compressed by using a lossy compression technique such as JPEG (Joint Photographic Experts Group). Because a compression efficiency of the lossy compression technique is easily controlled, file size or image quality can be selectively given priority depending on application. Meanwhile, a compression efficiency of the lossless compression technique is hard to control.

Patent Literature 1 discloses a technique as a method for improving a data compression efficiency in a case where such compression techniques are used. According to this technique, an inputted image is subjected to segmentation so that the inputted image is separated into line drawing image data and halftone image data. The line drawing image is stored in a memory directly or after implementation of reversible conversion, whereas the halftone image data is stored in the memory after implementation of lossy compression using frequency conversion. In this way, the data is compressed.

CITATION LIST

Patent Literature 1

Japanese Patent No. 2984332 (Issue Date: Nov. 29, 1999)

Patent Literature 2

Japanese Patent Application Publication, Tokukai, No. 2002-94805 A (Publication Date: Mar. 29, 2002)

Patent Literature 3

Japanese Patent Application Publication, Tokukai, No. 2002-232708 A (Publication Date: Aug. 16, 2002)

SUMMARY OF THE INVENTION

Technical Problem

However, according to a technique of Patent Literature 1, all halftone images in the background layer, other than line drawing, are uniformly subjected to compression using frequency conversion. Depending on a setting of the compression, the compression may cause deterioration in image quality, for example, unwanted compression noise in a boundary section between halftone images of different colors or emergence of block noise due to compression in an originally uniform halftone image. Further, compression of a uniform color halftone image based on frequency conversion and storage of thus compressed image is a redundant process.

The present invention is attained in view of the above problem. An object of the present invention is to provide an image processing apparatus, an image forming apparatus, an image processing method, and a computer-readable storage medium storing an image processing program each of which makes it possible to improve a compression efficiency and to improve image quality.

Solution to Problem

In order to solve the problem described above, the present invention implements further improvement in the compression efficiency and image quality, by (i) separating input image data into a foreground layer containing text and line drawing and a background layer made of a region other than the text and line drawing and (ii) applying a different data storage method according to a characteristic of a partial image in the background layer.

In order to solve the problem mentioned above, an image processing apparatus of the present invention performing a compression process on an input image, the image processing apparatus includes: background layer generation means generating a background layer by extracting a text region from the input image and removing at least the text region from the input image; background region extraction means extracting, from the background layer, a background region corresponding to a color characteristic, the background region extraction means including: background color estimation means estimating, from the background layer, a background color that is a uniform local background color determined to belong in a same color, according to the color characteristic, or a uniform page background color determined to belong in a same color, according to the color characteristic; and background image extraction means extracting, from the background layer, the background region having the background color estimated; coordinate recording section recording coordinate values of the background region extracted by the background region extraction means; and data storage section storing the background region in a form in accordance with the color characteristic of the background region extracted by the background region extraction means, the data storage section storing a local background and a page background as information including the background color estimated by the background color estimation means and the coordinate values of the background region having the background color, the local background and the page background being included in the background layer.

Advantageous Effects of Invention

According to the configuration, each background region that is included in the background layer and is of a different color characteristic is extracted and stored in a form in accordance with a characteristic of thus extracted background region. Accordingly, because data is stored according to the color characteristic of the background region, it is possible to perform data compression appropriate according to the characteristic of each background region. Accordingly, it becomes possible to perform data compression in which a data size is further reduced and also to prevent the occurrence of compression noise. This contributes to improvement in image quality.

Further, according to the configuration, the image processing apparatus can extract a uniform local background region that is determined to belong in the same color, according to the color characteristic, or a uniform page background region that is determined to belong in the same color, according to the color characteristic. Further, the image processing apparatus can store the local background and the page background each of which is included in the background layer and each of which is information including the color and coordinate values of the background region. Accordingly, an appropriate compression can be performed to the local background region and the page background region.

For a fuller understanding of the nature and advantages of the invention, reference should be made to the ensuing detailed description taken in conjunction with the accompanying drawings.

BRIEF DESCRIPTION OF DRAWINGS

FIG. 5 is a diagram showing an example of an index table.

FIG. 6 is a diagram showing another example of an index table.

DESCRIPTION OF EMBODIMENTS

The present invention relates to a method for further improving a compression efficiency of an image and image quality by using, in consideration of image properties, different data storage methods with respect to a background layer of layers into which the image is separated.

Figure 3:
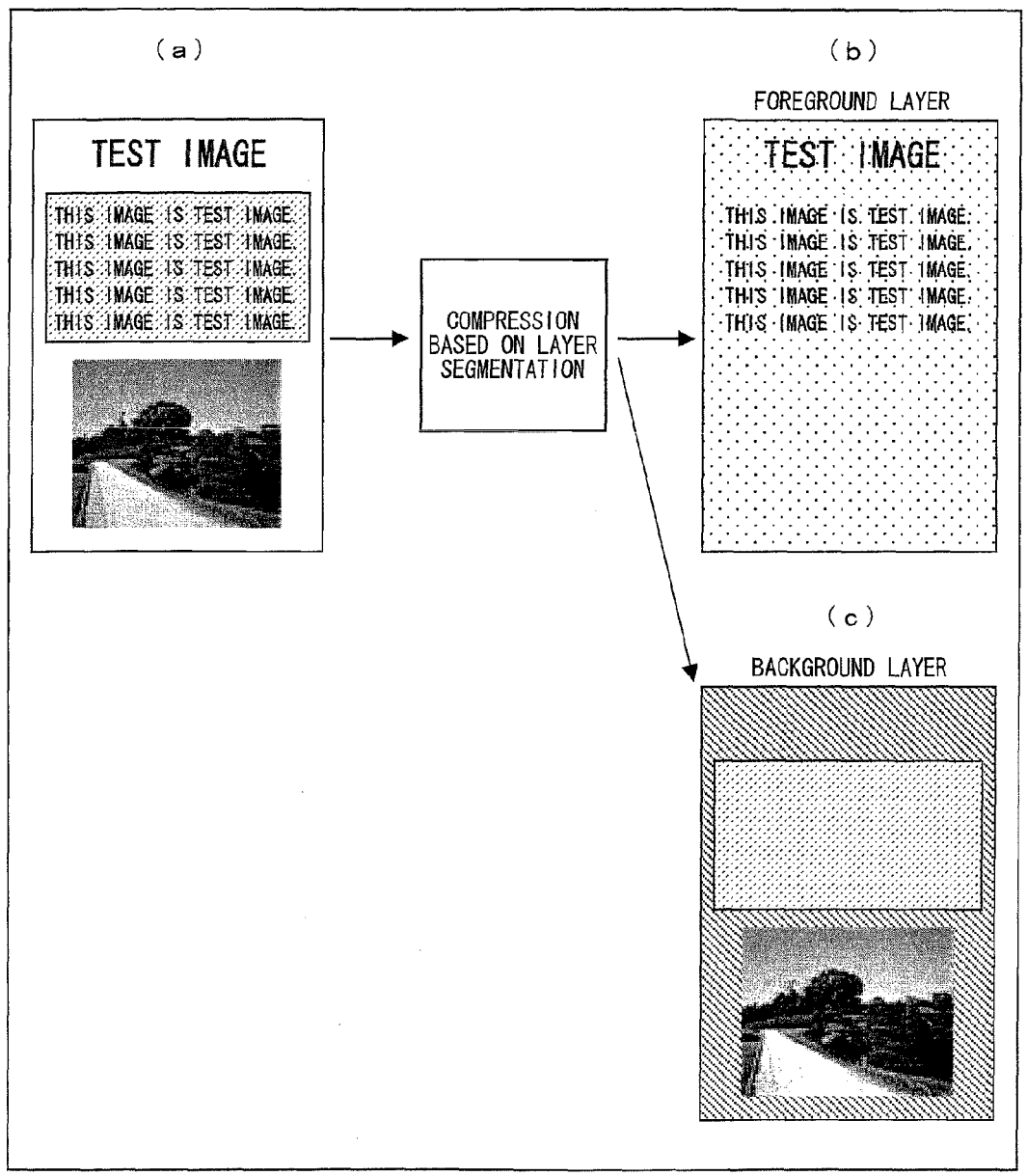
FIG. 3 is a diagram illustrating an image compression technique based on layer separation. (a) of FIG. 3 illustrates an input image. (b) of FIG. 3 illustrates a foreground layer containing text and line drawing. (c) of FIG. 3 illustrates a background layer containing an image other than the foreground layer.

First, FIG. 3 is a diagram illustrating an image compression technique based on layer separation. A typical example of the image compression technique is MRC (Mixed Raster Content). An input image shown in (a) of FIG. 3 is separated into a foreground layer, as shown in (b) of FIG. 3, containing a text and line drawing, and a background layer, as shown in (c) of FIG. 3, containing an image other than the background layer. A pixel color of the foreground layer is converted to an index and ultimately compressed by using a lossless compression technique. Typical examples of the lossless compression technique are JBIG (Joint Bilevel Image Group), MMR (Modified Modified Read Code), LZW (Lempel Ziv Welch). On the other hand, the background layer is compressed by using a lossy compression technique. A typical example of the lossy compression technique is JPEG (Joint Photographic Experts Group).

Figure 4:
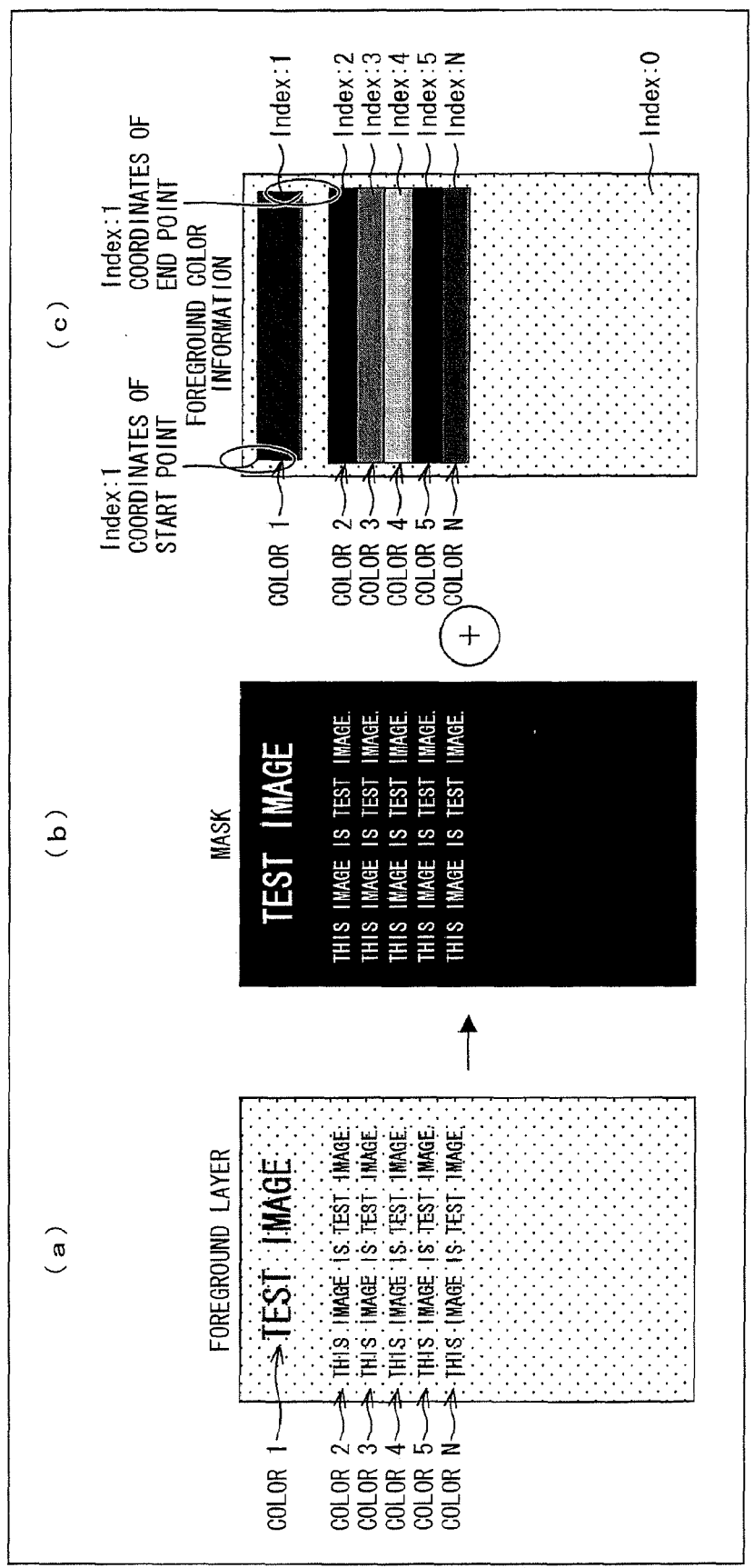
FIG. 4 is a diagram illustrating a technique for further decomposing the foreground layer into a foreground mask and foreground color information. (a) of FIG. 4 illustrates a foreground layer. (b) of FIG. 4 illustrates a binary mask. (c) of FIG. 4 illustrates the background color information including at least one test color.

FIG. 4 is a diagram illustrating a technique for further decomposing the foreground layer to a foreground mask and foreground information (text color information). The foreground layer shown in (a) of FIG. 4 is decomposed to a binary mask as shown in (b) of FIG. 4 and foreground information (information of a foreground pixel color), as shown in (c) of FIG. 4, including at least one text color. Then, data compression is carried out by applying the lossless compression technique to the foreground mask and applying the lossy compression technique to foreground color information. This makes it possible to improve the compression efficiency as compared with a case where a multi-bit foreground layer converted to an index is directly compressed.

(Compression Process)

Figure 2:
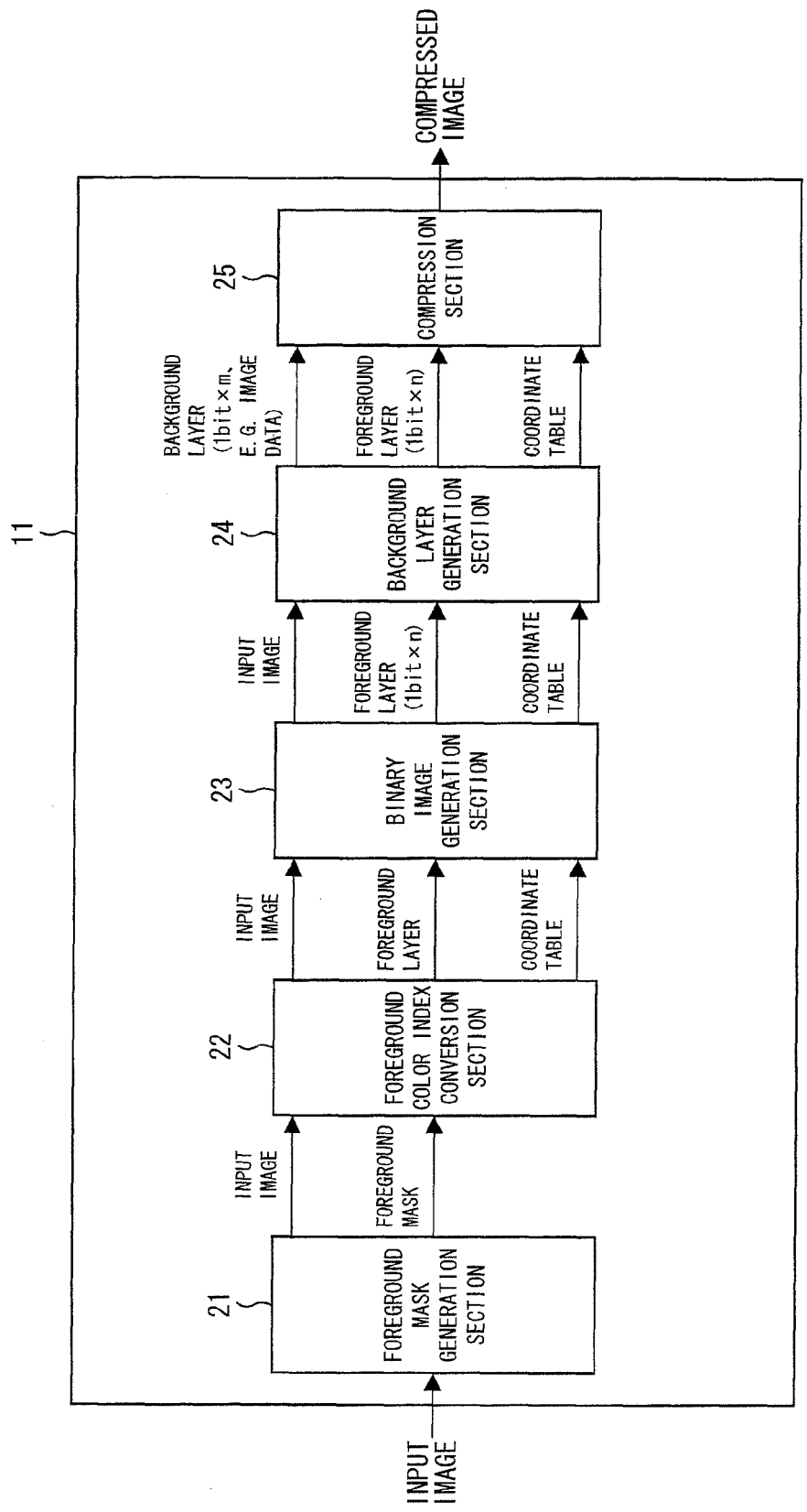
FIG. 2 illustrates a block diagram illustrating a configuration of the compression process section included in the image processing apparatus of the present embodiment.

First, the following explains a compression process section that is a configuration characterizing the image processing apparatus of the present invention. A configuration of the whole image processing apparatus and configurations of a whole image forming apparatus and a whole image scanning apparatus which include the image processing apparatus are explained later. FIG. 2 is a block diagram illustrating a configuration of a compression process section 11 included in the image processing apparatus of the present embodiment. The compression process section 11 includes a foreground mask generation section 21, a foreground color index conversion section (a section for converting a foreground color to an index) 22, a binary image generation section 23, a background layer generation section (background layer generation means) 24, and a compression section 25.

The foreground mask generation section 21 extracts a text region as the foreground layer from an input image and generates a foreground mask. In this process, a pixel determined as the text region in a segmentation process explained later is converted to a binary value pixel, and a text pixel is extracted. After the text pixel is extracted form the input image, the rest of the input image is extracted as the background layer.

The background index conversion section 22 converts similar colors that are provided in relatively close positions to a single color (a representative color), and give each representative color an index so as to convert each representative color to the index. Then, the foreground index conversion section 22 generates a foreground index color table that stores (i) the foreground layer representing an index image, (ii) each representative foreground color (each text color of the foreground layer), (iii) maximum and minimum coordinates of a region of each representative foreground color, and (iv) the number of pixels of each index. For this process, a method described in Patent Literature 2 may be used. This method relates to a process for converting a foreground color to an index and representing all foreground pixel colors by a limited number of colors in generation of the foreground layer. More specifically, the foreground index color table is updated for the foreground pixels so that the entire foreground layer is ultimately converted to indices. In a case where, for each foreground pixel, it is determined that a foreground pixel color has been already registered in the foreground index color table, an index value of the closest color in the foreground index color table is assigned to the foreground pixel color. In a case where it is determined that the foreground pixel color has not been registered in the foreground index color table, a new index value is assigned to the foreground pixel color and the new index is registered in the foreground index color table. This process is repeated so as to convert the foreground layer to indices.

The index image here indicates an image whose colors are represented by, for example, indices from 0 to 31. Such an index image is obtained by replacing similar colors of a full-color image (color text and line drawing) by a representative color (subtractive color process). In handling color information of an image, in general, if it is possible to express color information of 24 bits in total, that is, 8 bits for each of R, G, and B, by representative colors of 5 bits (31 colors at the maximum on the assumption that an index of the ineffective region is 0), an index image can be obtained by replacing each color represented by the representative color to an index. If sizes of the full-color image and the index image are the same, data reduction of 5 bits from 24 bits can be achieved. Further, because probability that the same value successively occurs is high, compression efficiency is improved.

As the simplest method among specific methods of the subtractive color process, there is a following method. That is, each of RGB channels is made of 8 bits (pixel values from 0 to 255), and a plurality of ranges are determined within 8 bits. Then, for each channel, values in each range are replaced by a value. For example, if the following replacement is performed for each channel, the colors are subtracted to 3×3×3=27 colors at the maximum.

Range 1: 0 to 99 ⇒ 20
Range 2: 100 to 155 ⇒ 128
Range 3: 156 to 255 ⇒ 235

This allows the color information to be within 5 bits as explained above.

For enhancing preciseness or for assigning representative colors efficiently, each of the plurality of ranges may be made narrower, and a histogram is made in regard to the number of pixels corresponding to colors within each of the ranges. Then, only pixel colors in desired ranges having higher frequencies of pixels in the histogram are converted to representative colors whose number corresponds to the number of the desired ranges. Each of the other pixel colors in the other ranges having lower frequencies of pixels are integrated into the closest representative color. For example, on the assumption that five ranges are set for each of RGB channels, a color space can be divided into 125 ranges at the maximum. Then, a histogram of thus divided ranges is made, and 31 colors of higher frequencies of pixels are set as representative colors. The other colors are integrated into the closest representative colors, respectively. In this way, a subtractive color process to 5 bits is accomplished.

The integration process of the ranges having lower frequencies of the pixels in the histogram may be performed for original color information, or alternatively for each representative color of the range to which each pixel color belongs. More precise color replacement is possible by use of the original color information. However, in this case, a large amount of calculation becomes necessary. The calculation is simple Euclidean distance calculation. In the calculation, a distance to a representative color of each higher frequency is calculated and a range having a distance of the minimum value is specified.

As alternative methods, for example, an intermediate value of each range or an average value of pixels in each range may be used as the representative color.

The above foreground index color table has an arrangement as shown in FIG. 5. Here, the foreground index color table as shown in FIG. 5 corresponds to (c) of FIG. 4. In a case where an address is to be arranged to correspond to an index number, as shown in FIG. 6, the foreground index color table may be expressed in the form in which the index is omitted. Further, each of coordinate values, text colors, the number of pixels may be expressed in different tables.

Figure 7:
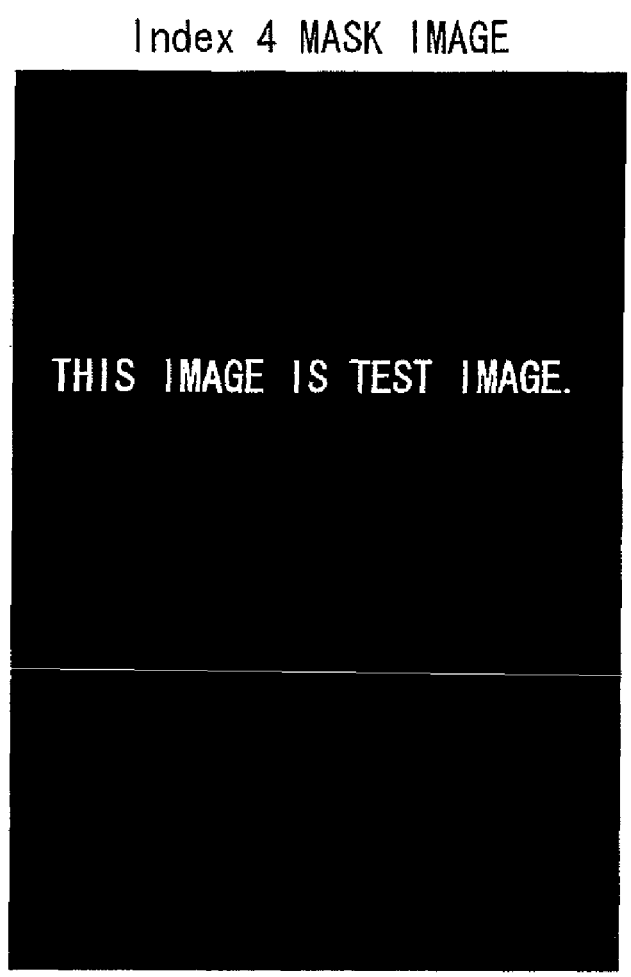
FIG. 7 is a diagram showing an example of a binary image of an index.

The binary image generation section 23 generates a binary image of each index, by using an inputted foreground layer and coordinate information that is generated by the foreground index conversion section 22. In an example shown in FIG. 7, a binary image of Index 4 is generated for an inputted index image, by outputting the pixels of only Index 4 as 1 (Index 4 in (c) of FIG. 4) and all the other pixels as 0. Here, though only Index 4 is raised as an example, there are indices as many as indices registered in the foreground index color table. For each of the indices, a binary image is generated.

The background layer generation section (background layer generation means) 24 generates the background layer by removing the pixels forming the foreground layer from the input image. Here, in the background layer generation section 24, for improving a compression efficiency of the background layer, a section corresponding to foreground pixels in the background layer (background-layer foreground-pixel section, foreground layer section in the background pixel section) is generally filled by using surrounding background layer pixels (background pixels) that are not foreground pixels (hole-filling process). With reference to the background pixels that are around the foreground pixels and not the foreground pixels, the background-layer foreground-pixel section is filled by use of an average value of the background pixels. In a case where the background pixels that are not foreground pixels do not exist in the vicinity, for example, in a case where no background pixel that is not the foreground pixel exist in a region referred to (e.g., in a mask made of 5×5 pixels), the process is carried out with reference to a result of a preceding hole-filling process. For example, a result of a pixel neighboring on the left of a pixel to which a hole-filling process is to be performed, a pixel neighboring on the right of the pixel to which a hole-filling process is to be performed, or an average value of these results may be used. In the compression process section 11 of the image processing apparatus of the present invention, the general method as explained above is further improved as explained below for the process carried out by the background layer generation section 24 so that compression (transmission) efficiency and image quality is improved.

Figure 1:
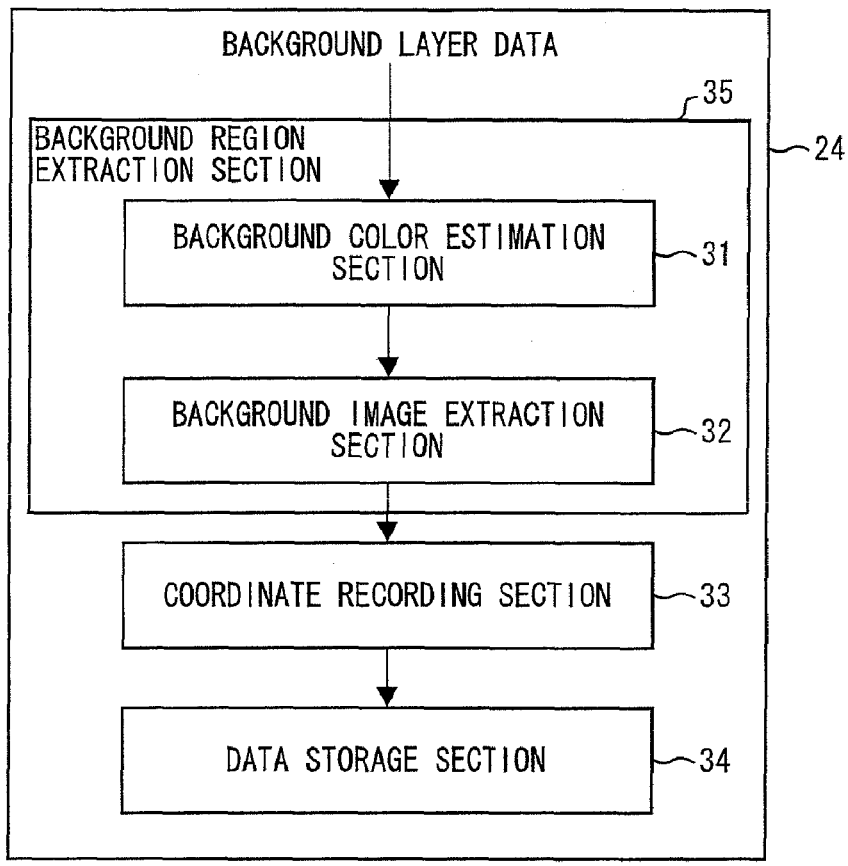
FIG. 1(a) is a diagram illustrating a configuration of a compression process section and a background layer generation section each included in an image processing apparatus of the present embodiment.
FIG. 1(b) is a diagram illustrating a configuration of a background image extraction section that the background layer generation section includes.
Figure 1:
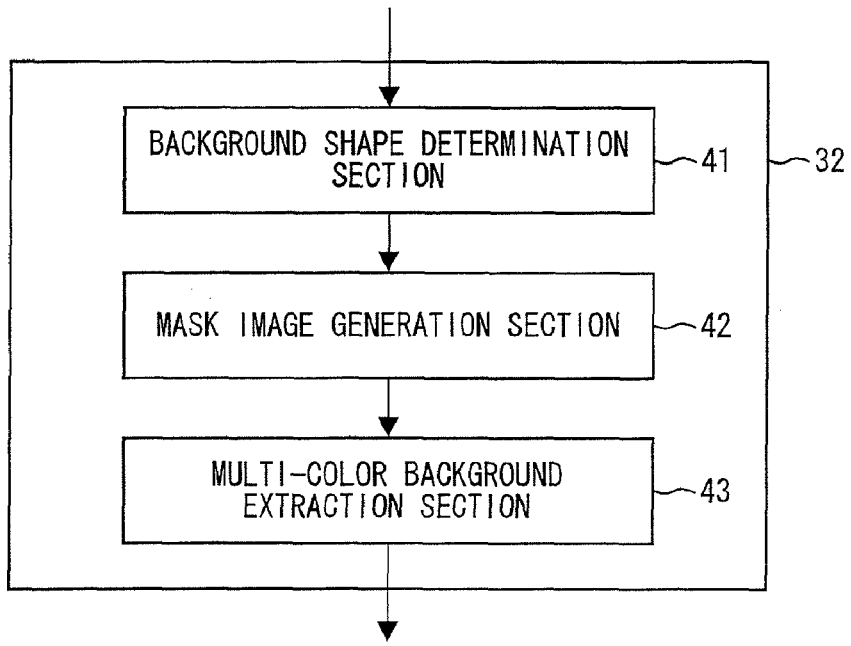

As shown in FIG. 1(*a*), the background layer generation section 24 includes a background region extraction section (background region extraction means) including a background color estimation section (background color estimation means) 31 and a background image extraction section (background image extraction means) 32, a coordinate recording section (coordinate recording section) 33, and a data storage section (data storage section) 34.

The following explains a process carried out by the background layer generation section 24. Explained below is a case where: (i) in regard to the background layer, estimation is made regarding a value of a uniform local background color determined to belong in the same color, according to a color characteristic, or a page background color determined to belong in the same color, according to a color characteristic; (ii) a background region of the local background or the page background is stored; and (iii) a data storage method is switched between a method in the case of the uniform background region and a method in the case of regions other than the background region.

Figure 8:
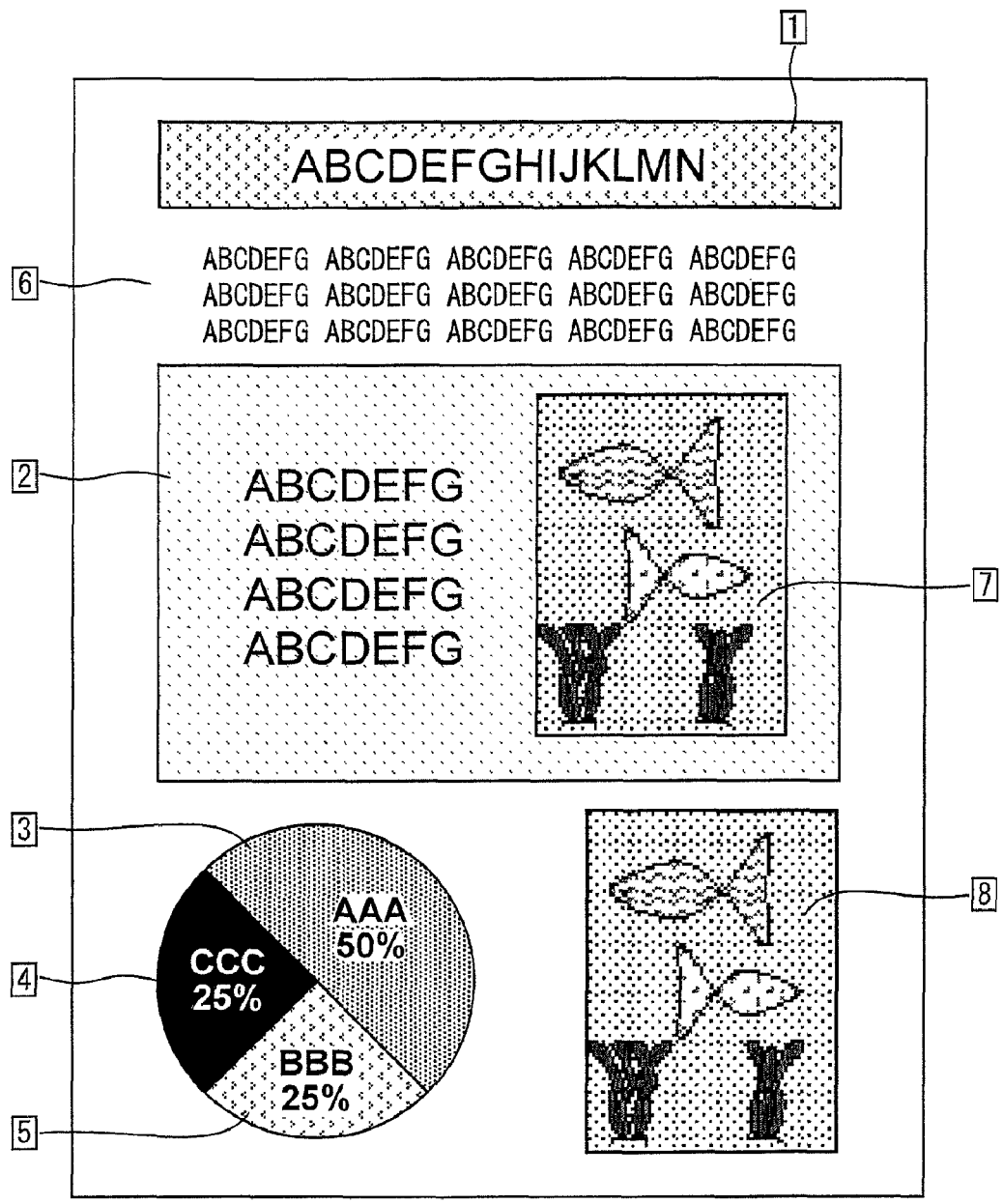
FIG. 8 is a diagram showing an example of a document image.
Figure 9:
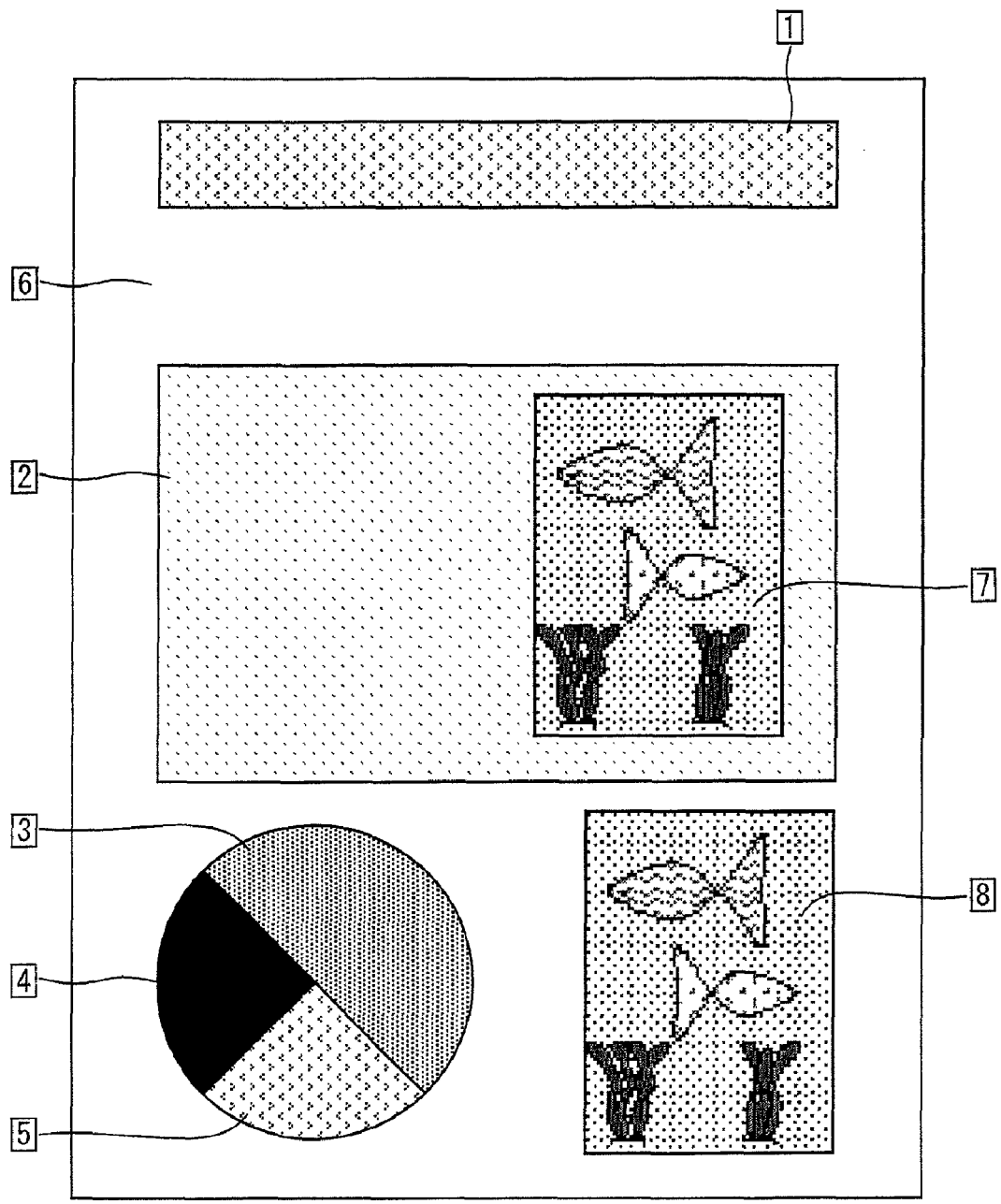
FIG. 9 is a diagram showing a background layer.
Figure 10:
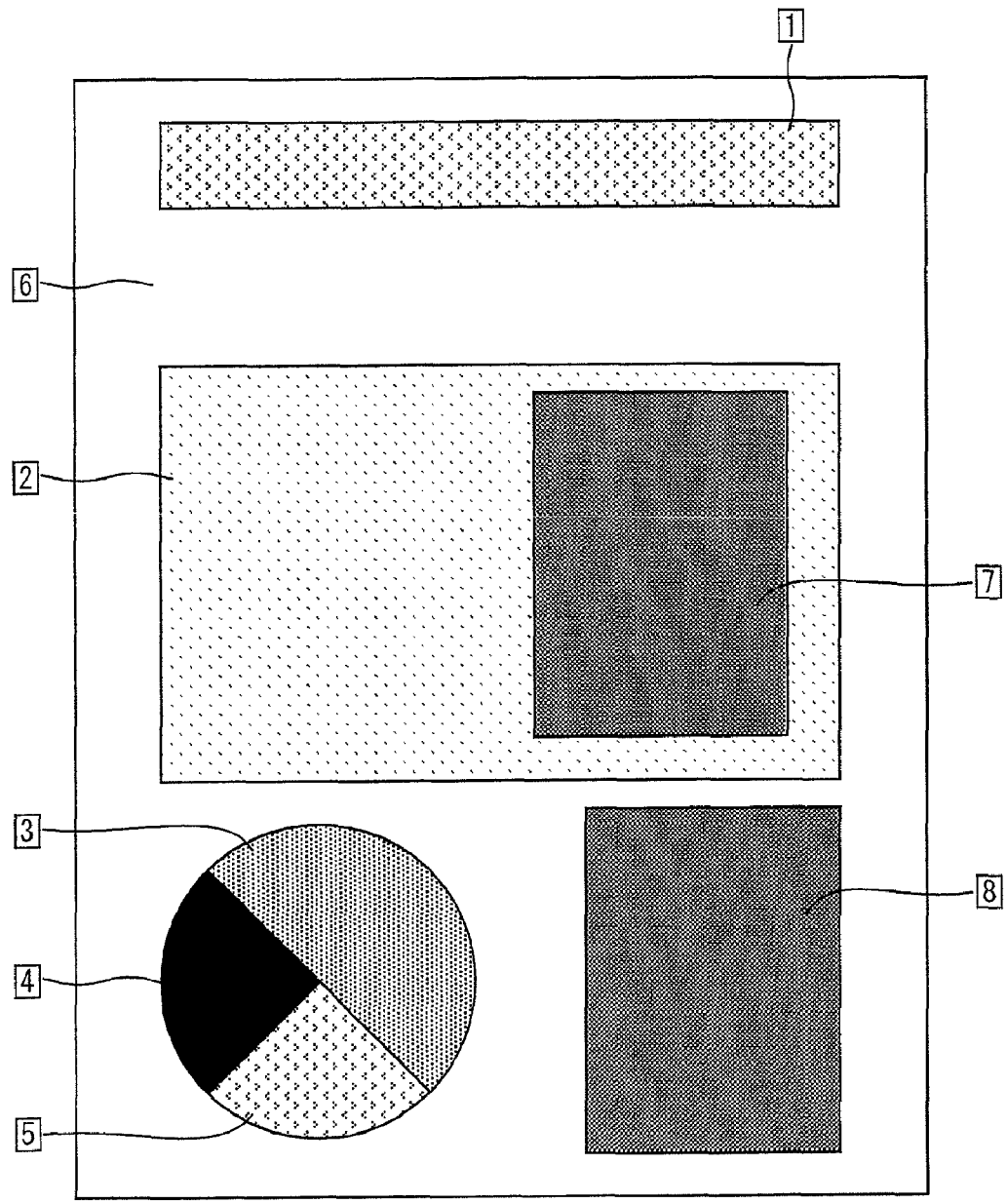
FIG. 10 is a diagram showing an index image of the background layer.

The data of the background layer shown in FIG. 9 of the input image shown in FIG. 8 is first inputted into the background color estimation section 31. Then, estimation is made as to whether the background color is a uniform page background color determined to belong in the same color, according to the color characteristic, or a uniform local background color determined to belong in the same color, according to the color characteristic. Next, the data of the background layer is sent to the background image extraction section 32 together with thus estimated background color information. The background color extraction section 32 extracts a region corresponding to each of the estimated background colors. The background image extraction section 32 extracts regions indicated by the label numbers 1 to 6 because these regions have uniform background colors. Meanwhile, the regions indicated by the label numbers 7 and 8 are of a natural image (photographic image), and therefore the background image extraction section 32 does not extract the regions indicated by the label numbers 7 and 8. In FIG. 10, all over the regions indicated by the label numbers 7 and 8 are colored. This indicates that the regions indicated by the label numbers 7 and 8 show photographic images and are not extracted. In other words, the regions indicated by the label numbers 7 and 8 are directly outputted to the compression section 25. For estimating the page background color or the local background color and specifying the region of the page background color or the local background color, the following method, for example, is used. First, the input image is divided into a plurality of divisions so that a divisional histogram is made for each of the divisions. Then, a plurality of peaks are found by using the divisional histograms, and a value of a peak that is among a plurality of peaks of the plurality of divisional histograms and present in many divisions is estimated as a background color of a whole page. Then, a value of a peak having the number of pixels not less than a predetermined threshold in histograms of continuous divisions or a histogram of one division is estimated as a local background color. Then, pixels each having a value close to one of the estimated values of these background colors are extracted. Further, unwanted noises of the pixels are removed by, for example, special morphology operation, thereby further extracting the pixels of the background colors. In this way, the page background color or the local background color are estimated and a region of the page background color or the local background color is specified.

A background map (a map in which a background region is extracted for each background color) of each background color outputted may be made by using a one bitmap for each background color. Alternatively, each region in data of one image may be subjected to indexing. In this case, for example, the numeral values of the label numbers 1 to 6 in FIG. 10 may be used directly as index values. The regions indicated by the label numbers 7 and 8 in FIG. 9 are provided with an index of "0" because these regions are not extracted.

Figure 11:
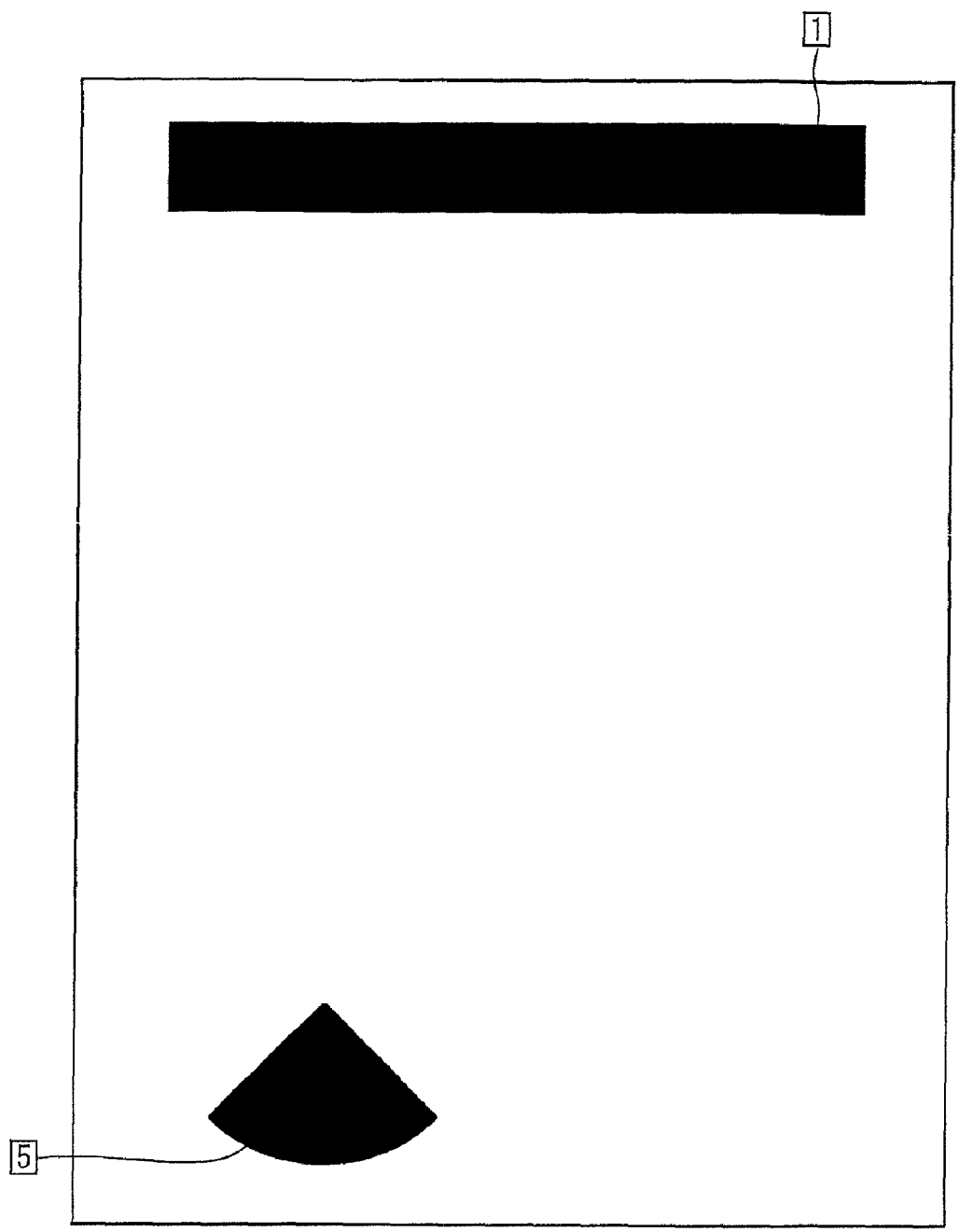
FIG. 11 is a diagram showing a one-bit background map.

In a case where, in data of one image, there are a plurality of regions of the background colors each determined to have a uniform color, that is, in a case of the background regions indicated by the label numbers 1 and 5 in FIG. 10, the plurality of regions may be considered directly as one region having a complicated shape. In a one bitmap including the regions indicated by the label numbers 1 and 5 as shown in FIG. 11, a labeling process may be performed so that the regions are divided.

Thus generated information is individually stored, in the data storage section 34, in the form appropriate to the information.

Figure 12:
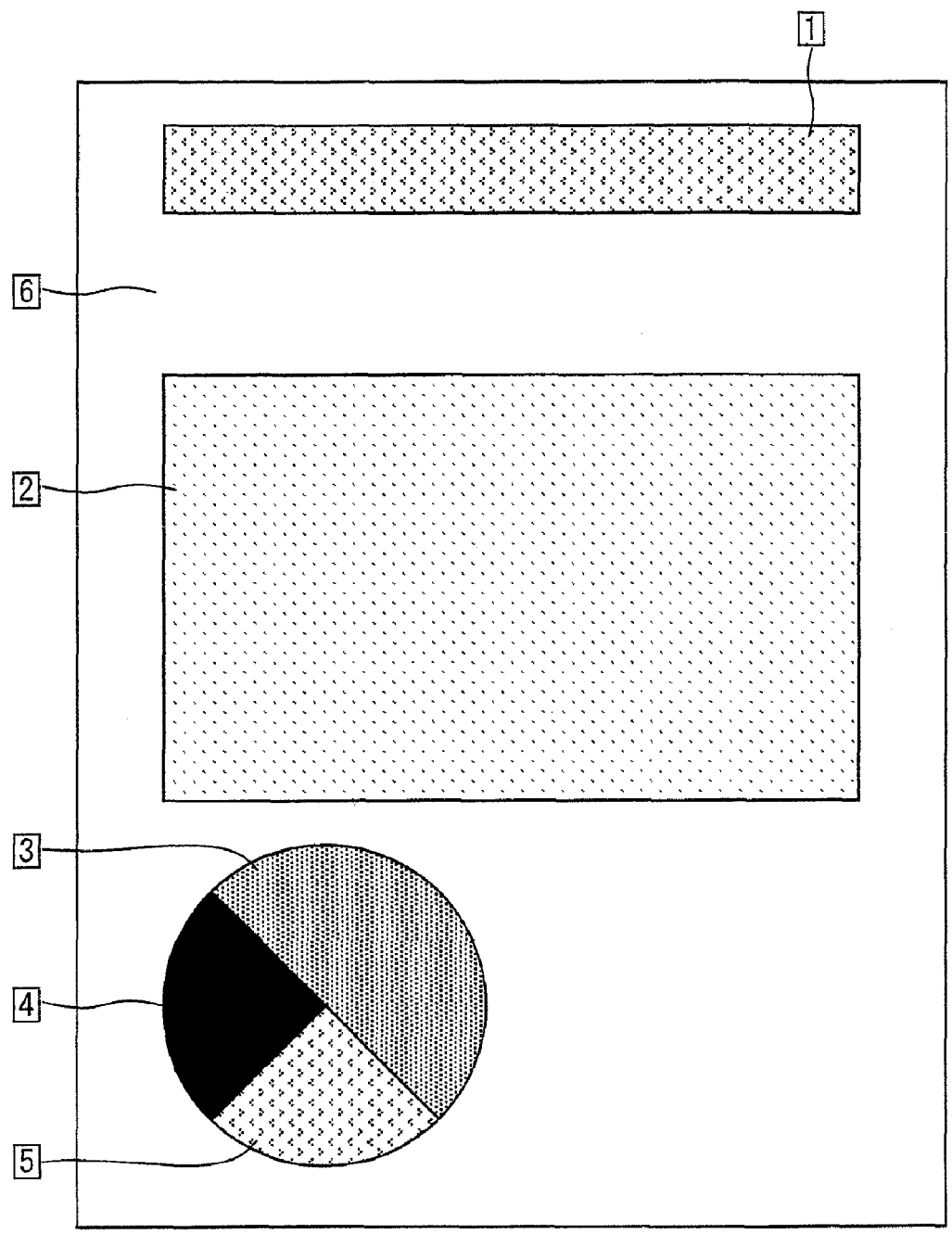
FIG. 12 is a diagram showing an example of an index image of background regions.
Figure 13:
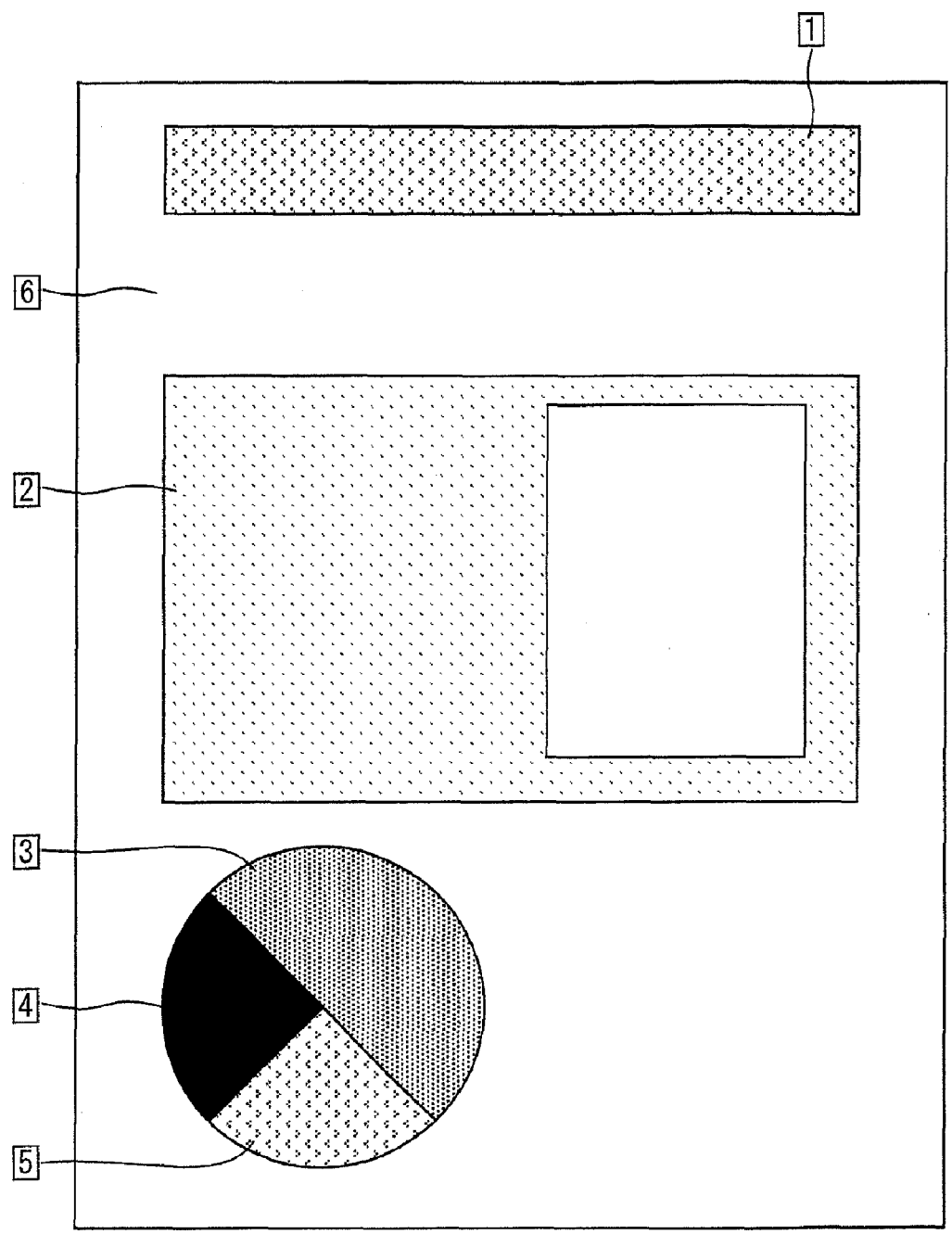
FIG. 13 is a diagram showing another example of an index image of background regions.

In the case of an index image, a background color may be specified as a drawing color of the index. Now, an index image is explained by use of an example. An index image is an image whose Index is each label number as shown in FIG. 12. In the region indicated by the label number 2, a section where there previously was the region indicated by the label number 7 is filled by background information of the region indicated by the label number 2. In a case where the section that previously was the region indicated by the label number 7 is not filled, the image becomes as shown in FIG. 13. In this case, the region of the label number 2 is not determined as a rectangle by a background shape determination section 41. That is, in the case where the section is not filled, an information amount to be stored increases as compared with a case where the section is filled. Therefore, an index image as shown in FIG. 12 is more preferable.

Further, as shown in FIG. 1(*b*), the background image extraction section 32 may include the background shape determination section (background shape determination means) 41 for determining a shape of the extracted background region, a mask image generation section (mask image generation means) 42, and a multi-color background extraction section (multi-color background extraction means) 43.

In a case where a background layer of a background color is a one bitmap, the background shape determination section 41 takes account of a background area S that is an area of an extracted region and a rectangle area A that is an area of a rectangle region surrounding the background area S. Then, where the background area S is not less than a predetermined value (for example, 99%) of the rectangle area A, the background shape determination section 41 determines that the extracted region is a rectangle region. At this time, the data storage section 34 stores coordinates of a start point and an end point of the rectangle region in place of the one bitmap image data.

Figure 14:
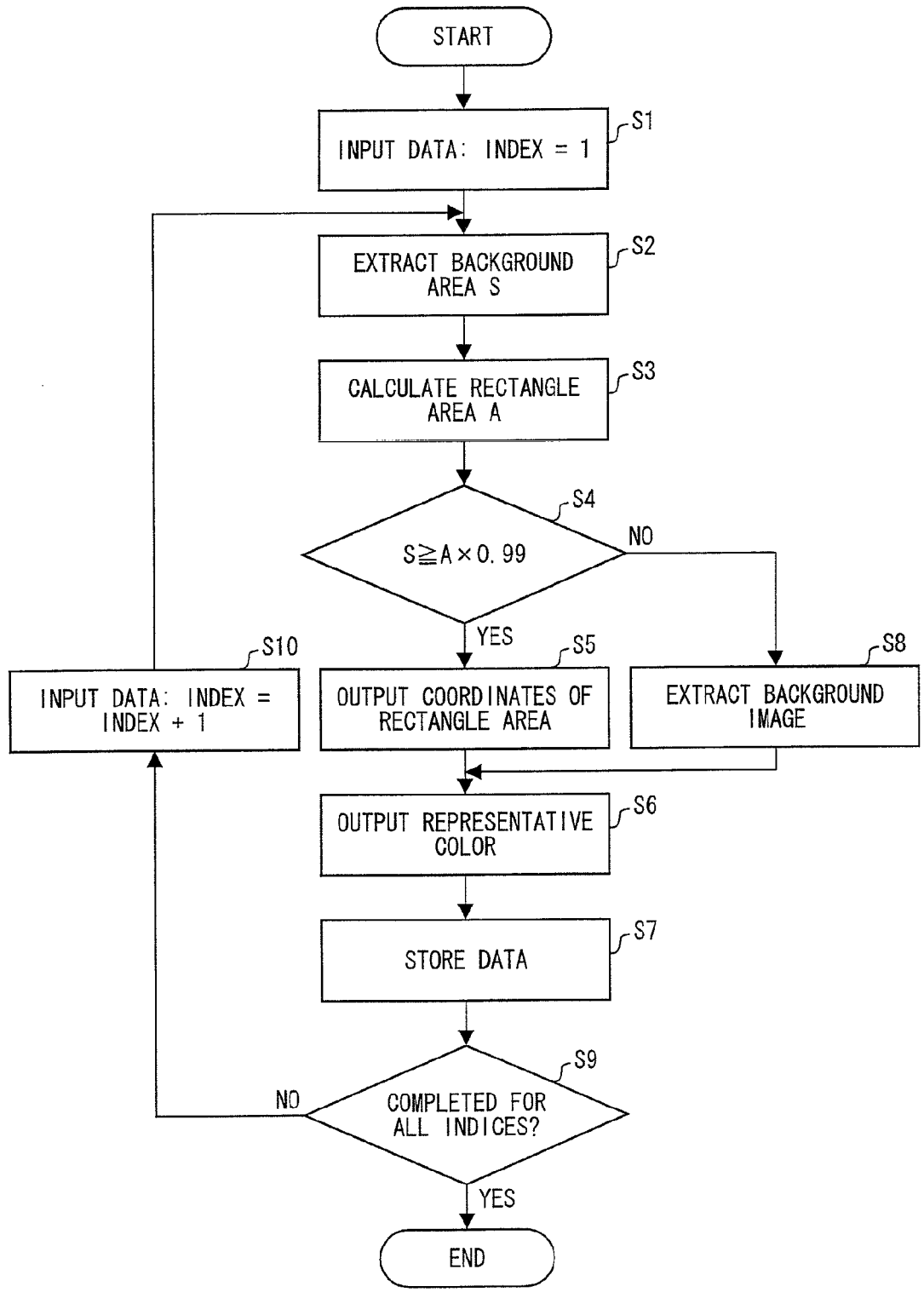
FIG. 14 is a flow chart illustrating a flow of a rectangle determination processing.

That is, in the present embodiment, when the shape of the background is determined, steps that flow as shown in FIG. 14 are carried out. First, when data of Index 1 is inputted (Step S1, hereinafter abbreviated as S1), a background area S is calculated (S2) and a rectangle area A is calculated (S3). Then, it is determined whether the background area S is not less than a threshold (e.g., 99%) of the rectangle area A (S4). In a case where the background area S is not less than the threshold of the rectangle area A (YES in S4), coordinates of the rectangle are outputted (S5) and a background color (representative color) is also outputted (S6). The data storage section stores the coordinates and the background color (S7). In a case where the background area S is less than the threshold of the rectangle area A (NO in S4), the background image is extracted (S8) and the step proceeds to S5. Here, in a case where the background area S is less than the threshold (e.g., 99%) of the rectangle area A, the mask image generation section 42 generates a one bitmap image data (mask image) that shows a shape of the extracted region. The data storage section 34 stores this mask image as the shape of the background region, and may further store the background color as the drawing color of the region.

Then, it is determined whether or not the shape determination of the background area S has been completed for each of all indices. In a case where the shape determination has not been completed (NO in S9), the index number is increased by one (S10) and the steps from S2 are repeated.

The multi-color background extraction section 43 divides and extracts, as each continuous region, the region that has not been extracted as a uniform color background region as shown by the sections indicated by the label numbers 7 and 8 in FIG. 10. For example, in the same manner as in the regions indicated by the label numbers 1 and 5 in FIG. 11 previously shown, the regions are converted to a one bitmap and a labeling process is carried out. Then, the multi-color background extraction section 43 distinguishes each continuous region and outputs thus processed one bitmap together with information of a rectangle surrounding the region. Here, the information of the rectangle is information of coordinate values (upper-left coordinate values and lower-right coordinate values of the rectangle) indicating the rectangle. At this time, regions other than the actual multi-color image region may be replaced by zero or a transparent color.

The compression section 25 applies appropriate compression to each layer. Stored index data or one bitmap data of the foreground layer and a single color background data is compressed by using a lossless compression technique. Typical examples of the lossless compression technique are JBIG (Joint Bilevel Image Group), MMR (Modified Modified Read Code), and LZW Lempel Ziv Welch). On the other hand, the multi-color data of the background layer is compressed by a lossy compression technique such as JPEG (Joint Photographic Experts Group).

As shown in FIG. 4, the compression section 25 decomposes the multi-bit foreground layer or background index data (an index image of the background region) into a binary mask and color information made of at least one representative color (text color or background color). This makes it possible to improve the compression efficiency.

(Segmentation Process)

For a segmentation process, a method described in Patent Literature 3 may be used, for example. The segmentation process is carried out by a segmentation process section 10 included in an image processing apparatus of the present embodiment explained later. According to the method described in Patent Literature 2, a maximum density difference and total density busyness are calculated. The maximum density difference is a difference between a minimum density value and a maximum density value in an n×m (e.g., 15×15) block including a target pixel, and the total density busyness is the sum total of absolute values of density differences between adjacent pixels. Then, the maximum density difference and the total density busyness are compared with a plurality of predetermined thresholds. As a result of the comparison, pixels are segmented into a page-background region, a photograph region (continuous tone region), a text edge region, and a halftone dot region. For carrying out the segmentation, the following features (1) to (4) are used.

(1) The density distribution in the page-background region is such that both the maximum density difference and the total density busyness are very small because, typically, the density changes only a little.

(2) The density distribution in the photograph region is such that the density smoothly changes and both the maximum density difference and the total density busyness are small but more or less larger than those in the page-background region.

(3) The density distribution in the halftone dot region is such that the maximum density difference varies depending on halftone dots. There are changes in the total density busyness as many as the number of halftone dots. Accordingly, a ratio of the total density busyness to the maximum density difference is high. Accordingly, in a case where the total density busyness is larger than a product of the maximum density difference and a text/halftone dot determining threshold (one of the plurality of thresholds mentioned above), it is possible to determine that the pixel is a halftone dot pixel.

(4) The density distribution in the text region is such that the maximum density difference is large and, accordingly, the total density busyness is also large. However, the density changes less as compared with the density in the halftone dot region. Therefore, the total density busyness is smaller than that in the halftone dot region. Accordingly, in a case where the total density busyness is smaller than a product of the maximum density difference and the text/halftone dot determining threshold, it is possible to determine that the pixel is a text edge pixel.

The following explains a flow of the segmentation process. First, (i) the calculated maximum density difference is compared with a maximum density difference threshold, and (ii) the calculated total density busyness is compared with a total density busyness threshold. Then, if it is determined that the maximum density difference is smaller than the maximum density difference threshold and that the total density busyness is smaller than the total density busyness threshold, the target pixel is determined to be a page-background/photograph region; otherwise, the target pixel is determined to be a text/halftone dot region.

In a case where the target pixel is determined to be the page-background/photograph region, the calculated maximum density difference is compared with a page-background/photograph determining threshold. If the maximum density difference is smaller, the target pixel is determined to be the page-background region. If the maximum density difference is larger, the target pixel is determined to be the photograph region.

In a case where the target pixel is determined to be the text/halftone dot region, the calculated total density busyness is compared with the product of the maximum density difference and the text/halftone dot determining threshold. If the total density busyness is smaller, the target pixel is determined to be the text edge region. If the total density busyness is larger, the target pixel is determined to be the halftone dot region. It should be noted that the text region into which the target pixel is segmented in the segmentation process includes a text pixel and a line drawing pixel.

The present invention is applicable to the following configuration. An example of the application is explained below.

(Image Forming Apparatus)

Figure 15:
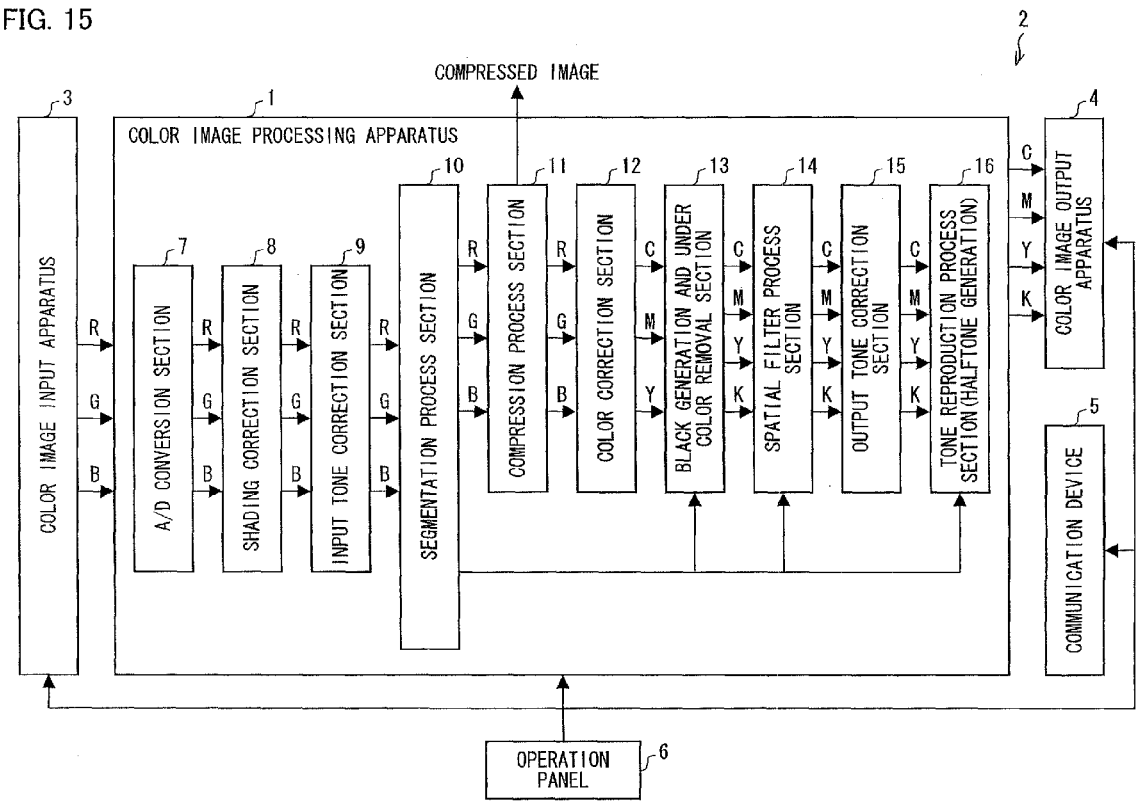
FIG. 15 is a diagram illustrating a configuration of an image forming apparatus including the image processing apparatus of one embodiment of the present invention.

FIG. 15 is a block diagram illustrating a configuration of a digital color multifunction printer (image forming apparatus) 2 that includes a color image processing apparatus (image processing apparatus) 1 according to an embodiment of the present invention. As shown in FIG. 15, the color image processing apparatus 1 is connected with a color image input apparatus 3, a color image output apparatus 4, a communication device 5, and an operation panel 6. These apparatuses, the communication device 5 and panel as a whole constitute the digital color multifunction printer (image forming apparatus) 2.

The operation panel 6 includes, for example, a setup button for controlling operations and the like of the digital color multifunction printer 2, a numeric keypad, and a display section such as a liquid crystal display.

The color image input apparatus 3 includes a scanner section including a device, such as a CCD (Charge Coupled Device), for converting optical information to an electric signal, and outputs, as an RGB analogue signal, a reflected light image of a document.

The analogue signal obtained by scanning by the color image input apparatus 3 is transmitted, in the color image processing apparatus 1, through an A/D conversion section 7, a shading correction section 8, an input tone correction section 9, a segmentation process section 10, a compression process section 11, a color correction section 12, a black generation and under color removal section 13, a spatial filter process section 14, an output tone correction section 15, and a tone reproduction process section 16 in this order. Then, the analogue signal is outputted to the color image output apparatus 4 as a CMYK digital color signal.

The A/D conversion section 7 converts the RGB analogue signal to an RGB digital signal. The shading correction section 8 subjects the digital RGB signal transmitted from the A/D conversion section 7 to a process for removing various distortions produced in an illumination system, an image focusing system, and an image sensing system of the color image input apparatus 3.

The input tone correction section 9 carries out color balance adjustment on the RGB signal from which the various distortions are removed. Concurrently, the input tone correction section 9 carries out a process for converting the RGB signal to a signal, such as a density signal (pixel value), easy to handle for the color image processing apparatus 1.

The segmentation process section 10 segments, according to the RGB signal, pixels in the input image to one of a plurality of regions including a text region, a halftone dot region, and a photograph region. In accordance with a result of the segmentation, the segmentation process section 10 outputs a segmentation class signal indicating which region a pixel belongs to the compression process section 11, the black generation and under color removal section 13, the spatial filter process section 14, and the tone reproduction process section 16. The segmentation process section 10 also passes the input signal from the input tone correction section 9 to the color correction section at a subsequent stage without modifying the input signal.

The compression process section 11 carries out the compression process on the RGB signal and the segmentation class signal which are inputted thereto. Compressed image data is temporarily stored in storage means (not illustrated), such as a hard disk. For example, in a case where a "scan to e-mail" mode is selected on the operation panel 6, the compressed image data is attached to an e-mail and transmitted from the communication device 5, such as a network card and a modem, to a designated destination. Alternatively, in a case where there is a request for printing, corresponding image data is read out and subjected to a decoding process. Then, image processing (processes after the color correction) in a subsequent stage is carried out. Furthermore, the compression process section may be arranged to continuous the image processing in a subsequent stage on the input image data as well as to store the compressed image data.

In order to faithfully reproduce color, the color correction section 12 carries out a process for removing color impurity attributed to spectral characteristics of CMY color material containing an unnecessarily absorbed component.

The black generation and under color removal section 13 carries out a process for generating a black (K) signal from a CMY three-color signal after color correction and a process for generating a new CMY signal by removing the K signal obtained by the black generation from the original CMY signal. With these processes, the CMY three-color signal is converted to a CMYK four-color signal.

In accordance with the segmentation class signal, the spatial filter process section 14 carries out a special filter process with use of a digital filter on image data of the CMYK signal that is inputted from the black generation and under color removal section. In this way, the spatial filter process section 14 corrects spatial frequency characteristics. With this process, a blur or granularity deterioration in an output image can be reduced. In a similar manner to the spatial filter process section, the tone reproduction process section 16 carries out, in accordance with the segmentation class signal, a predetermined process described later on the image data of the CMYK signal.

For example, for a region segmented into a text by the segmentation process section 10, the spatial filter process section 14 strongly emphasizes (sharpens) a high frequency component in order to improve reproducibility of the text. At the same time, the tone reproduction process section 16 carries out a binarization or multi-level dithering process by use of a high-resolution screen which is suitable for reproduction of the high-frequency component.

Furthermore, on a region segmented into a halftone dot by the segmentation process section 10, the spatial filter process section 14 carries out a low-pass filter process for removing an input halftone dot component. Then, the output tone correction section 15 carries out an output tone correction process for converting a signal, such as a density signal, to a halftone dot area ratio which is a characteristic value of the color image output apparatus 4. Subsequently, image data is finally segmented into pixels by the tone reproduction process section 16, and then the image is subjected to a tone reproduction process for reproducing each tone of the pixels. On a region segmented into a photograph by the segmentation process section 10, a binarization or multi-level dithering process is carried out by use of a screen suitable for tone reproduction.

Image data on which the aforementioned processes are carried out is temporarily stored in storage means (not illustrated). Then, the image data is read out at a predetermined timing, so as to be inputted to the color image output apparatus 4.

This color image output apparatus 4 outputs image data on a recording medium, such as a sheet. Examples of the color image output apparatus are electrophotographic and ink-jet color image output apparatuses. Such a color image output apparatus is not particularly limited.

The aforementioned processes are controlled by a CPU (Central Processing Unit) (not illustrated).

Furthermore, in the case of facsimile transmission, a modem carries out pre-transmission proceedings with a destination. When a transmittable state is secured, image data compressed in a predetermined manner (image data scanned by a scanner) is read out from the memory. After a necessary process, such as conversion of a compression format, is carried out, the image data is sequentially transmitted to the destination via a communication line. Moreover, in the case of facsimile reception, the CPU, while carrying out pre-communication proceedings, receives image data transmitted from an originating communication device and inputs the image data to the color image processing apparatus 1. In the color image processing apparatus 1, an compression/decompression section (not illustrated) carries out a decompression process on the received image data. The decompressed image data is subjected to a rotation process and/or a resolution conversion process, if necessary. Then, the output tone correction and the tone reproduction process are carried out on the decompressed image data, so that the decompressed image data is outputted from the color image output apparatus 4. Furthermore, the digital color multifunction printer 2 carries out data communication with a computer or another digital multifunction printer connected to, for example, a network via the communication device 5, such as a network card or a modem and a LAN cable.

The aforementioned example describes a color multifunction printer, but this multifunction printer may be a black and white multifunction printer.

(Image Scanning Apparatus)

Figure 16:
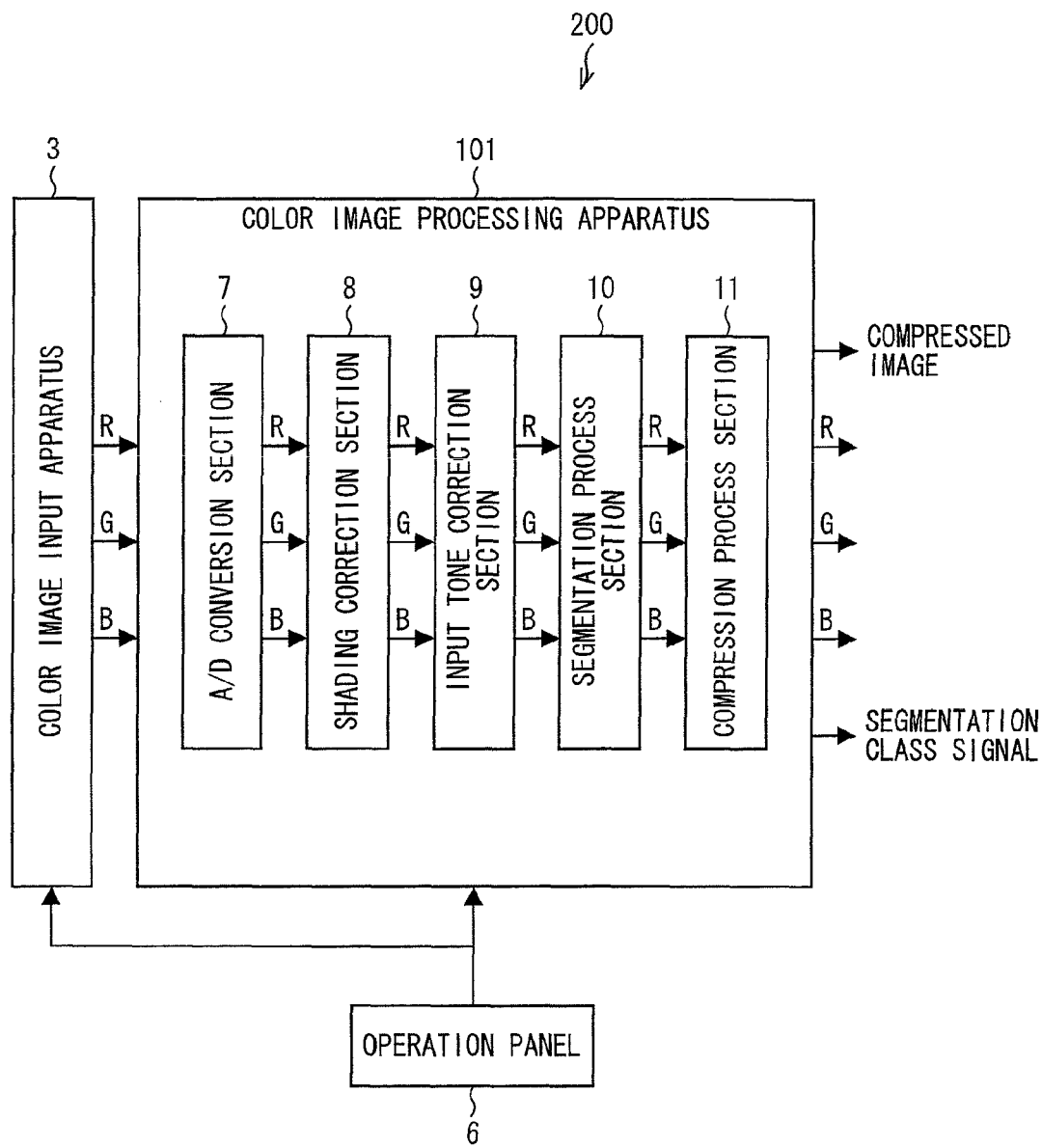
FIG. 16 is a diagram illustrating a configuration of an image scanning apparatus of one embodiment of the present invention.

FIG. 16 shows a block diagram illustrating a configuration of an image scanning apparatus (flat head scanner) 200 including a color image processing apparatus (image processing apparatus) 101 of an embodiment of the present invention. As shown in FIG. 16, the color image processing apparatus 101 includes the an A/D conversion section 7, the shading correction section 8, the input tone correction section 9, the segmentation process section 10, and the compression process section 11. The color image input apparatus 3 is connected to the color image processing apparatus 101. These apparatuses as a whole constitute the image scanning apparatus 200.

The color image input apparatus (image scanning means) 3 is constituted by a scanner section including, for example, a CCD (Charge Coupled Device). The color image input apparatus 3 scans, by use of the CCD, a reflected light image of a document as an RGB (R: Red, G: Green, and B: Blue) analogue signal and inputs the scanned analogue signal to the color image processing apparatus 101. The analogue signal obtained by scanning by the color image input apparatus 3 is transmitted in the color image processing apparatus 101 through the A/D conversion section 7, the shading correction section 8, the input tone correction section 9, the segmentation process section 10, and the compression process section 11 in this order.

The A/D (analogue/digital) conversion section 7 is a block in which the RGB analogue signal is converted to an RGB digital signal. By the shading correction section 8, the digital RGB signal transmitted from the A/D conversion section 7 is subjected to a process for removing various distortions produced in an illumination system, an image focusing system, and an image sensing system of the color image input apparatus 3.

The input tone correction section 9 carries out color balance adjustment on the RGB signal (an RGB reflectance signal) from which the various distortions are removed by the shading correction section 8. Concurrently, the input tone correction section 9 carries out a process for converting this RGB signal to a signal, such as a density signal, easy to handle for the color image processing apparatus 101.

The segmentation process section 10 segments, according to the RGB signal, pixels in the input image into one of a plurality of regions including a text region, a halftone dot region, and a photograph region.

The compression process section 11 carries out the compression process on the RGB signal inputted thereinto. Thus compressed image data is transmitted and outputted to a computer, a printer, and/or a multifunction printer via a network. In this case, the printer, the multifunction printer and/or the computer need to be arranged to be capable of decoding the compressed image data. Moreover, there may be a case where the scanned image data and the segmentation class signal is transmitted to the computer, the printer, and/or the multifunction printer without carrying out the compression process on the data and the signal. Also in this case, the printer, the multifunction printer, and/or the computer need to be arranged to be capable of processing the image data in accordance with the segmentation class signal.

(Recording Medium and Program)

An embodiment of the present invention may be arranged such that an image processing method for carrying out the aforementioned compression process is recorded on a computer-readable storage medium which records program codes of a program for allowing execution by a computer (an execution mode program, an intermediate code program, and a source program). This makes it possible to provide in a portable manner a storage medium which records a program code for implementing the image processing method for carrying out the aforementioned compression process.

Furthermore, in the present embodiment, this storage medium may be a memory (not illustrated), such as a ROM, since the process is carried out by a microcomputer. Alternatively, the program medium may also be arranged such that a program reader device is provided as an external storage device (not illustrated) and the program medium is read by inserting the recording medium to the program reader device.

In any case, the stored program code may be arranged to be executed by access of a microprocessor. Alternatively, in any case, such a mechanism is also possible that: a program code is read out; the read-out program code is downloaded in a program storage area of a microcomputer (not illustrated); and the program code is executed. This program for downloading is previously stored in the main device.

Here, the program medium is a storage medium which is arranged to be detachable from the main body. The program medium may also be any of media fixedly bearing a program code, including: (i) a tape, such as a magnetic or cassette tape; (ii) a disk, including a magnetic disk, such as a flexible disk or hard disk, or an optical disk, such as a CD-ROM, MO, MD, or DVD; (iii) a card, such as an IC (including a memory card) or optical card; or (iv) a semiconductor memory by a mask ROM, EPROM (Erasable Programmable Read Only Memory), EEPROM (Electrically Erasable Programmable Read Only Memory), or flash ROM.

Moreover, in the present embodiment, the system is arranged to be connectable to a communication network, including the Internet and thus the system may also be a medium occasionally bearing a program code so that a program code is downloaded from the communication network. Furthermore, in a case where the program code is downloaded from the communication network in such a manner, the program for downloading may be previously stored in the main device or may be installed from another storage medium.

The storage medium is read by a program reader device provided in a digital color image forming apparatus or a computer system, whereby the image processing method is implemented. Further, the present invention can also be realized with an embodiment of a computer data signal in which the program code is realized by electronic transmission and which is embedded in carrier waves.

Moreover, a computer system is constituted by: (i) an image input device, such as a flat head scanner, a film scanner, or a digital camera; (ii) a computer in which various processes, such as the image processing method, are carried out by a predetermined program being downloaded; (iii) an image display apparatus, such as a CRT display or a liquid crystal display, for displaying a result of the processes carried out by the computer; and (iv) a printer for outputting, on a sheet or the like, the result of the processes carried out by the computer. The computer system is further provided with a network card or a modem as communication means so as to be connected to a server or the like via a network.

As described above, an image processing apparatus of the present invention performing a compression process on an input image, the image processing apparatus includes: background layer generation means generating a background layer by extracting a text region from the input image and removing at least the text region from the input image; background region extraction means extracting, from the background layer, a background region corresponding to a color characteristic, the background region extraction means including: background color estimation means estimating, from the background layer, a background color that is a uniform local background color determined to belong in a same color, according to the color characteristic, or a uniform page background color determined to belong in a same color, according to the color characteristic; and background image extraction means extracting, from the background layer, the background region having the background color estimated; coordinate recording section recording coordinate values of the background region extracted by the background region extraction means; and data storage section storing the background region in a form in accordance with the color characteristic of the background region extracted by the background region extraction means, the data storage section storing a local background and a page background as information including the background color estimated by the background color estimation means and the coordinate values of the background region having the background color, the local background and the page background being included in the background layer.

According to the configuration, each background region that is included in the background layer and is of a different color characteristic is extracted and stored in a form in accordance with a characteristic of thus extracted background region. Accordingly, because data is stored according to the color characteristic of the background region, it is possible to perform data compression appropriate according to the characteristic of each background region. Accordingly, it becomes possible to perform data compression in which a data size is further reduced and also to prevent the occurrence of compression noise. This contributes to improvement in image quality.

Further, according to the configuration, the image processing apparatus can extract a uniform local background region that is determined to belong in the same color, according to the color characteristic, or a uniform page background region that is determined to belong in the same color, according to the color characteristic. Further, the image processing apparatus can store the local background and the page background each of which is included in the background layer and each of which is information including the color and coordinate values of the background region. Accordingly, an appropriate compression can be performed to the local background region and the page background region.

In addition to the configuration above, the image processing apparatus of the present invention may be arranged such that: the background image extraction means includes background shape determination means determining a shape of the background region extracted; the coordinate recording section records coordinate values indicative of a rectangle region including the background region extracted by the background image extraction means; and when the background shape determination means determines that the shape of the background region is rectangle, the data storage section stores the local background and the page background as information including the background color estimated by the background color estimation means and the coordinate values indicative of a rectangle region recorded in the coordinate recording section, the local background and the page background being included in the background layer.

According to the configuration, it becomes possible to significantly reduce a data amount of many single-color rectangle background regions that are present on a document (original document). Further, it also becomes possible to keep color uniformity.

In addition to the configuration above, the image processing apparatus of the present invention may further include: mask image generation means generating a mask image showing the shape of the background region in the rectangle region, wherein, in a case where the background shape determination means determines that the shape of the background region is not rectangle, the data storage section stores the local background and the page background as information including: the background color estimated by the background color estimation means; the coordinate values indicative of the rectangle region recorded in the coordinate value recording section; and data obtained by subjecting, to lossless compression, the mask image generated by the mask image generation means, the local background and the page background being included in the background layer.

According to the configuration, while a data amount is suppressed even in data storage of a background region other than the rectangle background region, reproduction of a uniform color becomes possible.

In addition to the configuration above, the image processing apparatus of the present invention may further include: multi-color background extraction means extracting image data of each continuous region in each background region that has not been extracted by the background image extraction means, the data storage section storing a multi-color background region as information obtained by subjecting, to lossy compression, image data of the each background region extracted by the multi-color background extraction means, the multi-color background region being included in the background layer.

According to the configuration, a background region (e.g., photograph region or gradation) whose color is not monochrome is individually subjected to lossy compression and stored. This makes it possible to reduce data.

In order to solve the problem mentioned above, the image forming apparatus of the present invention includes any one of the image processing apparatus is described above. Because the image forming apparatus of the present invention includes the image processing apparatus of the present invention, the image forming apparatus of the present invention can perform image formation in which a compression efficiency and image quality are further improved.

In order to solve the problem mentioned above, the image scanning apparatus of the present invention includes any one of the image processing apparatus is described above. Because the image scanning apparatus of the present invention includes the image processing apparatus of the present invention, the image scanning apparatus of the present invention can perform image scanning at an improved compression efficiency.

In order to solve the problem mentioned above, an image processing method of the present invention for performing a compression process on an input image, the image processing method includes the steps of: generating a background layer by extracting a text region from the input image and removing at least the text region from the input image; extracting, from the background layer, a background region corresponding to a color characteristic, the step of extracting the each background region including the substeps of: estimating, from the background layer, a background color that is a uniform local background color determined to belong in a same color, according to the color characteristic, or a uniform page background color determined to belong in a same color, according to the color characteristic; and extracting, from the background layer, the background region having the background color estimated; recording coordinate values of the background region extracted in the step of extracting the background region; and storing the background region in a form in accordance with the color characteristic of the background region extracted in the step of extracting the background region, wherein, in the step of storing the background region, a local background and a page background that are included in the background layer are stored, the local background and the page background being information including the background color estimated in the step of estimating the background color and the coordinate values of the background region having the background color.

According to the method, the same effect as the image forming apparatus of the present invention can be attained. This makes it possible to further improve a compression efficiency and image quality.

Moreover, the image processing apparatus of the present invention may be implemented by a computer. In this case, the present invention encompasses an image processing program causing a computer to function as means in the image processing apparatus so as to implement the image processing apparatus by a computer, and a computer-readable storage medium storing the image processing program.

According to the configuration, the same effect as the image forming apparatus of the present invention can be attained by causing a computer to read and execute the image processing program.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention is applicable to, for example, a color copying machine, a color printer, a monochrome copying machine, a monochrome printer, a MFP (Multi Function Printer), a scanner, and a personal computer each of which includes an image processing function.

The invention claimed is:
1. An image processing apparatus performing a compression process on an input image, the image processing apparatus comprising:
    a background layer generation section generating a background layer by extracting a text region from the input image and removing at least the text region from the input image;
    a background region extraction section extracting, from the background layer, a background region corresponding to a color characteristic, the background region extraction section including:
        a background color estimation section estimating, from the background layer, a background color that is a uniform local background color determined to belong in a same color, according to the color characteristic, or a uniform page background color determined to belong in a same color, according to the color characteristic; and
        a background image extraction section extracting, from the background layer, the background region having the background color estimated;
    a coordinate recording section recording coordinate values indicative of a rectangle region including the background region extracted by the background region extraction section; and
    a data storage section storing the background region in a form in accordance with the color characteristic of the background region extracted by the background region extraction section,
    the background image extraction section including: a background shape determination section determining a shape of the background region extracted; and a mask image generation section generating a mask image showing the shape of the background region, wherein,
    in a case where the background shape determination section determines that the shape of the background region is a rectangle, the data storage section stores a local background and a page background as information including: the background color estimated by the background color estimation section; and the coordinate values indicative of the rectangle region recorded in the coordinate recording section, the local background and the page background being included in the background layer, and
    in contrast, in a case where the background shape determination section determines that the shape of the background region is not a rectangle, the data storage section stores the local background and the page background as information including: the background color estimated by the background color estimation section; and data obtained by subjecting, to lossless compression, the mask image generated by the mask image generation section, the local background and the page background being included in the background layer.

2. The image processing apparatus as set forth in claim 1, further comprising:
    multi-color background extraction section extracting image data of each continuous region in each background region that has not been extracted by the background image extraction section;
    the data storage section storing a multi-color background region as information obtained by subjecting, to lossy compression, image data of the each background region extracted by the multi-color background extraction section, the multi-color background region being included in the background layer.

3. An image forming apparatus comprising the image processing apparatus as set forth in claim 1.

4. The image processing apparatus of claim 1, wherein the background color estimation section generates a plurality of divisional histograms and estimates a background color that is the uniform page background color corresponding to a maximum peak value among a plurality of peaks in the divisional histogram or a background color that is a uniform local background color corresponding to a color having a peak value and having a continuous area of pixels not less than a predetermined threshold.

5. The image processing apparatus of claim 1, wherein the data storage section stores a local background and a page background responsive to whether the background region extracted is determined to be a uniform local background color or a uniform page background color.

6. The image processing apparatus of claim 1, wherein the background region is extracted responsive to whether an area of the background region is less than a predetermined value.

7. The image processing apparatus of claim 1, wherein
the background color estimation section generates a background map indicating each background color estimated using a plurality of index numbers.

8. The image processing apparatus of claim 1, wherein,
the mask image generation section generates, as the mask image, one bitmap image data showing the shape of the background region extracted.

9. The image processing apparatus of claim 1, wherein
the data storage section stores coordinate values indicative of the background region determined to be a rectangle.

10. The image processing apparatus of claim 1, wherein
the rectangle region is smaller than the background layer.

11. The image processing apparatus of claim 1, wherein
the background color estimation section estimates a background color that is the uniform local background color as a color in the input image bounding an area an area smaller than the largest area in the background layer and larger than a predetermined threshold, which is at least larger than a single pixel.

12. The image processing apparatus of claim 7, wherein
a portion of a background region extracted corresponding to a uniform local background color is replaced with a surrounding estimated background color.

13. The image processing apparatus of claim 2, wherein each continuous region contains a plurality of colors.

14. A non-transitory computer-readable storage medium storing a program for causing a computer to operate as each section of the image processing apparatus as set forth in claim 1.

15. An image processing method for performing a compression process on an input image, the image processing method comprising:
generating a background layer by extracting a text region from the input image and removing at least the text region from the input image;
extracting, from the background layer, a background region corresponding to a color characteristic, said extracting further including:
estimating, from the background layer, a background color that is a uniform local background color determined to belong in a same color, according to the color characteristic, or a uniform page background color determined to belong in a same color, according to the color characteristic; and
extracting, from the background layer, the background region having the background color estimated;
the extracting the background region having the background color estimated including:
determining a shape of the background region extracted, and
generating a mask image showing the shape of the background region,
recording coordinate values indicative of a rectangle region including the background region extracted in the extracting the background region; and
storing the background region in a form in accordance with the color characteristic of the background region extracted in the extracting the background region,
wherein,
in a case where it is determined, in the determining the shape of the background region, that the shape of the background region is a rectangle, in the storing the background region, a local background and a page background that are included in the background layer are stored, as information including: the background color estimated in the estimating the background color and the coordinate values indicative of the rectangle region recorded in the recording the coordinate values, and
in contrast, in a case where it is determined, in the determining the shape of the background region, that the shape of the background region is not a rectangle, in the storing the background region, the local background and the page background that are included in the background layer are stored as information including: the background color estimated in the estimating the background color; and a data obtained by subjecting, to lossless compression, the mask image generated in the generating the mask image.

* * * * *